US012743117B2

(12) United States Patent
Ravelli et al.

(10) Patent No.: US 12,743,117 B2
(45) Date of Patent: Sep. 22, 2026

(54) FAST AND COMPACT PASS SWITCH DRIVER

(71) Applicant: STMicroelectronics International N.V., Geneva (CH)

(72) Inventors: Francesco Ravelli, Villa di Serio (IT); Alberto Gussoni, Cornaredo (IT); Fabrizio Martignoni, Morazzone (IT); Katia Ingala, Barrafranca (IT)

(73) Assignee: STMicroelectronics International N.V., Geneva (CH)

( * ) Notice: Subject to any disclaimer, the term of this patent is extended or adjusted under 35 U.S.C. 154(b) by 125 days.

(21) Appl. No.: 18/897,742

(22) Filed: Sep. 26, 2024

(65) Prior Publication Data

US 2026/0086590 A1 Mar. 26, 2026

(51) Int. Cl.
*G05F 1/56* (2006.01)
*G05F 1/575* (2006.01)

(52) U.S. Cl.
CPC .................................... *G05F 1/575* (2013.01)

(58) Field of Classification Search
CPC ............... G05F 1/46; G05F 1/56; G05F 1/575
See application file for complete search history.

(56) References Cited

U.S. PATENT DOCUMENTS

| | | | | |
|---|---|---|---|---|
| 9,793,707 | B2 * | 10/2017 | Torres | H02H 9/02 |
| 11,251,711 | B2 * | 2/2022 | Yao | H02M 1/0009 |
| 2006/0091961 | A1 | 5/2006 | Briskin et al. | |
| 2014/0021979 | A1 | 1/2014 | Huang | |
| 2014/0312963 | A1 | 10/2014 | Berkhout | |
| 2018/0233904 | A1 | 8/2018 | Terrill et al. | |
| 2018/0287602 | A1 | 10/2018 | Chauhan et al. | |

* cited by examiner

*Primary Examiner* — Adolf D Berhane
(74) *Attorney, Agent, or Firm* — Crowe & Dunlevy LLC

(57) ABSTRACT

Disclosed herein is a circuit for regulating current flow and power dissipation. The circuit includes a power transistor generating a load current, a sense transistor producing a scaled version of the load current, and a regulation circuit equalizing drain-to-source voltages of both transistors. A current comparison circuit generates a feedback current based on the difference between a reference current and the scaled load current. A feedback circuit adjusts the power transistor's control voltage based on this feedback current. When the scaled load current is below the reference current, the feedback circuit decreases the power transistor's on-resistance, reducing power dissipation. Conversely, when the scaled load current exceeds the reference current, the feedback circuit increases the power transistor's on-resistance, limiting current flow. This dynamic adjustment mechanism optimizes power efficiency and current regulation, making the circuit suitable for applications requiring precise current control and minimal power loss.

14 Claims, 2 Drawing Sheets

FAST AND COMPACT PASS SWITCH DRIVER

TECHNICAL FIELD

This disclosure relates generally to power management circuits, and more particularly to pass switch circuits used in electronic systems requiring controlled power distribution. Specifically, this disclosure pertains to improved pass switch designs that provide efficient power delivery and current limiting functionality across a wide range of load conditions.

BACKGROUND

Pass switches are widely used in power management circuits across various electronic systems, particularly in battery-powered devices and applications requiring controlled power distribution. These switches serve as power gating elements, allowing precise control over the delivery of power to different subsystems or loads within a device.

A conventional pass switch circuit 5 is now described with reference to FIG. 1. The pass switch circuit 5 includes an n-channel power transistor Mpower having its drain connected to receive a supply voltage V2 and its source connected to an output node OUT, with a load 8 (modeled by a capacitor CL and current source ILOAD) being connected between the output node OUT and ground. An n-channel sense transistor Msense having its drain connected to receive the supply voltage V2 and its source connected to a node N1. The gates of both Mpower and Msense are connected to receive a gate voltage VGATE.

An n-channel transistor M0 has its drain connected to node N1 and its source connected to node N2. A resistor Rsns is connected between node N2 and ground, with a sense voltage VSNS being formed at node N2. An amplifier 6 has its non-inverting input connected to node N1, its inverting input connected to the output node OUT, and its output connected to the gate of n-channel transistor M0.

A reference current generator IREF sources a reference current to node N3, with resistor Rref being connected between node N3 and ground such that a reference voltage VREF is formed at node N3.

Amplifier 7 receives the reference voltage VREF at its non-inverting input and the sense voltage VSNS at its inverting input. The amplifier 7 adjusts the gate voltage VGATE to maintain the sense voltage VSNS equal to the reference voltage VREF, effectively regulating the current through Mpower.

In operation, amplifier 6 drives the gate of n-channel transistor M0 such that the drain-to-source voltages of Msense and Mpower are the same (e.g., drives the gate of M0 such that the voltage at N1 is equal to the voltage at OUT).

The pass switch circuit operates by controlling the power delivery from the supply voltage V2 to the load through the power transistor Mpower. The gate voltage VGATE, generated by amplifier 7, controls both Mpower and Msense. As current flows through Mpower to the load, a proportional sense current flows through Msense, creating a voltage at node N1.

Amplifier 6 drives the gate of n-channel transistor M0 so that the voltage at node N1 matches the voltage at the output node OUT. As a result, the sense current flows through sense resistor Rsns to create the sense voltage VSNS at node N2, which is compared to the reference voltage VREF by amplifier 7.

The amplifier 7 adjusts the gate voltage VGATE to maintain the sense voltage VSNS to be equal to the reference voltage VREF, effectively regulating the current through Mpower.

During normal operation therefore, wherein the current through the load ILOAD is below the reference current IREF, the power transistor Mpower therefore functions as a low-resistance switch (e.g., is fully turned on into saturation), reducing power dissipation. If, however, the load current ILOAD exceeds the reference current IREF, the power transistor Mpower instead operates to limit the current sourced to the output node OUT, protecting both the power transistor Mpower and the load 8.

Two critical aspects of pass switch design are the speeds of its control loops: the inner loop implemented by amplifier 6, which equalizes the drain-source voltages of Mpower and Msense, and the outer loop implemented by amplifier 7, which regulates the overall current through Mpower.

Both loops play roles in controlling the output current, but the inner loop is particularly important as it maintains accurate current sensing across different operating conditions of Mpower. Specifically, the inner loop provides for proper current control during various phases of operation, such as startup when Mpower is in the saturation region, and steady-state operation when Mpower is in the ohmic region.

The speed of the outer loop is also crucial, as it determines the ability of the pass switch circuit 5 to respond swiftly to sudden load changes, especially during short-circuit events at the output node OUT. Rapid detection of overcurrent conditions and subsequent adjustment of the gate voltage of Mpower are of interest for effective current limitation. However, the wide variability in load capacitance, ranging from a few millifarads to hundreds of millifarads, presents a challenge in maintaining both stable operation and fast response times across diverse application scenarios. This variability complicates the design of the pass switch circuit 5, particularly in optimizing the outer control loop. Consequently, further development is needed to address these challenges and improve performance across a broad spectrum of load conditions, with a focus on enhancing the speed and stability of both of the inner and outer control loops.

SUMMARY

A circuit includes a power transistor that generates a load current to an output node and a sense transistor that generates a scaled version of the load current. A regulation circuit equalizes drain-to-source voltages of the power transistor and the sense transistor. A current comparison circuit coupled to the regulation circuit generates a feedback current based upon a difference between a reference current and the scaled version of the load current. A feedback circuit coupled to the current comparison circuit adjusts a control voltage of the power transistor based on the feedback current. When the scaled load current is below the reference current, the feedback circuit modifies the control voltage of the power transistor to decrease on-resistance of the power transistor and reduce power dissipation. When the scaled load current exceeds the reference current, the feedback circuit modifies the control voltage of the power transistor to increase the on-resistance of the power transistor and limit the current flow through the power transistor.

The power transistor may be an n-channel transistor having its gate connected to receive the control voltage. When the scaled load current is below the reference current, the feedback circuit may increase the control voltage of the power transistor, thereby decreasing the on-resistance of the power transistor and reducing power dissipation. When the scaled load current exceeds the reference current, the feedback circuit may decrease the control voltage of the power transistor, thereby increasing the on-resistance of the power transistor and limiting the current flow through the power transistor.

The sense transistor may have a source connected to the output node, a drain connected to the regulation circuit, and a gate receiving the control voltage. The regulation circuit may include an amplifier having a first input connected to a supply voltage, a second input connected to the drain of the sense transistor, and an output. The regulation circuit may also include an n-channel transistor having a drain connected to the current comparison circuit, a source connected to the drain of the sense transistor, and a gate connected to the output of the amplifier.

The feedback circuit may include a current mirror having an input receiving the feedback current and an output sinking a replica of the feedback current from the gate of the power transistor and the gate of the sense transistor.

The circuit may include a voltage limiting circuit coupled to the output node and the feedback circuit, the voltage limiting circuit configured to establish a minimum control voltage for the power transistor.

The power transistor may be a p-channel transistor having its gate connected to receive the control voltage. When the scaled load current is below the reference current, the feedback circuit may decrease the control voltage of the power transistor, thereby decreasing the on-resistance of the power transistor and reducing power dissipation. When the scaled load current exceeds the reference current, the feedback circuit may increase the control voltage of the power transistor, thereby increasing the on-resistance of the power transistor and limiting the current flow through the power transistor.

The sense transistor may have a drain connected to the output node, a source connected to the regulation circuit, and a gate receiving the control voltage. The regulation circuit may include an amplifier having a first input connected to a supply voltage, a second input connected to the source of the sense transistor, and an output. The regulation circuit may also include an n-channel transistor having a source connected to the current comparison circuit, a drain connected to the source of the sense transistor, and a gate connected to the output of the amplifier.

The feedback circuit may include a current mirror having an input receiving the feedback current and an output sourcing a replica of the feedback current to the gate of the power transistor and the gate of the sense transistor.

The circuit may include a voltage limiting circuit coupled between the output node and the feedback circuit, the voltage limiting circuit configured to establish a maximum control voltage for the power transistor.

A method of controlling a pass switch circuit includes generating a load current to an output node using a power transistor, generating a scaled version of the load current using a sense transistor, and equalizing drain-to-source voltages of the power transistor and the sense transistor using a regulation circuit. The method also includes generating a feedback current based upon a difference between a reference current and the scaled version of the load current using a current comparison circuit, and adjusting a control voltage of the power transistor based on the feedback current using a feedback circuit. When the scaled load current is below the reference current, the method includes modifying the control voltage of the power transistor to decrease on-resistance of the power transistor and reduce power dissipation. When the scaled load current exceeds the reference current, the method includes modifying the control voltage of the power transistor to increase the on-resistance of the power transistor and limit the current flow through the power transistor.

The power transistor may be an n-channel transistor. The method may include increasing the control voltage of the power transistor when the scaled load current is below the reference current, and decreasing the control voltage of the power transistor when the scaled load current exceeds the reference current.

The method may include receiving the feedback current at an input of a current mirror in the feedback circuit, and sinking a replica of the feedback current from a gate of the power transistor and a gate of the sense transistor using an output of the current mirror.

The method may include establishing a minimum control voltage for the power transistor using a voltage limiting circuit coupled to the output node and the feedback circuit.

The power transistor may be a p-channel transistor. The method may include decreasing the control voltage of the power transistor when the scaled load current is below the reference current, and increasing the control voltage of the power transistor when the scaled load current exceeds the reference current.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

Figure 1:
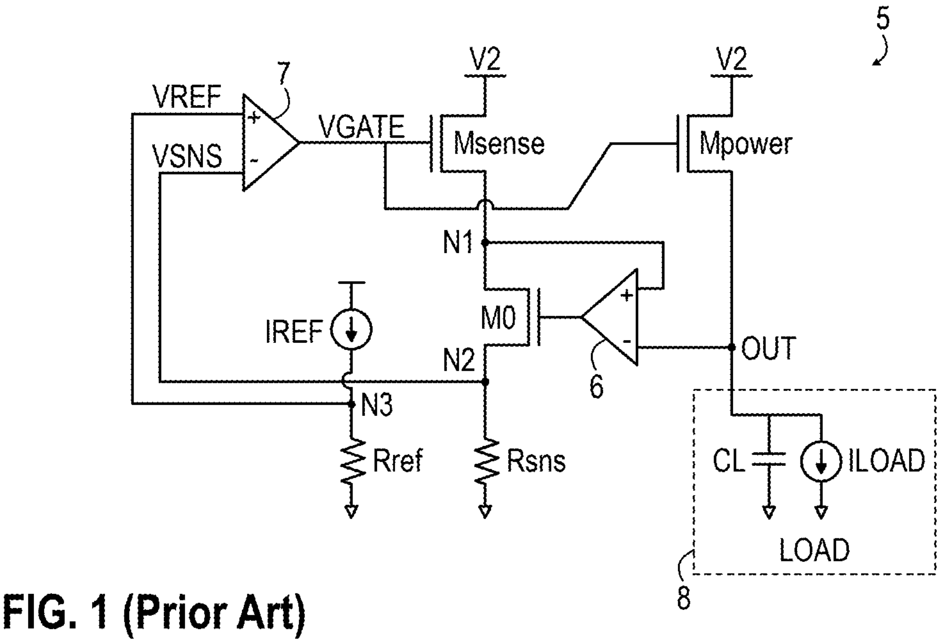
FIG. 1 (Prior Art)
FIG. 1 is a schematic diagram of a prior art pass switch circuit.
Figure 2:
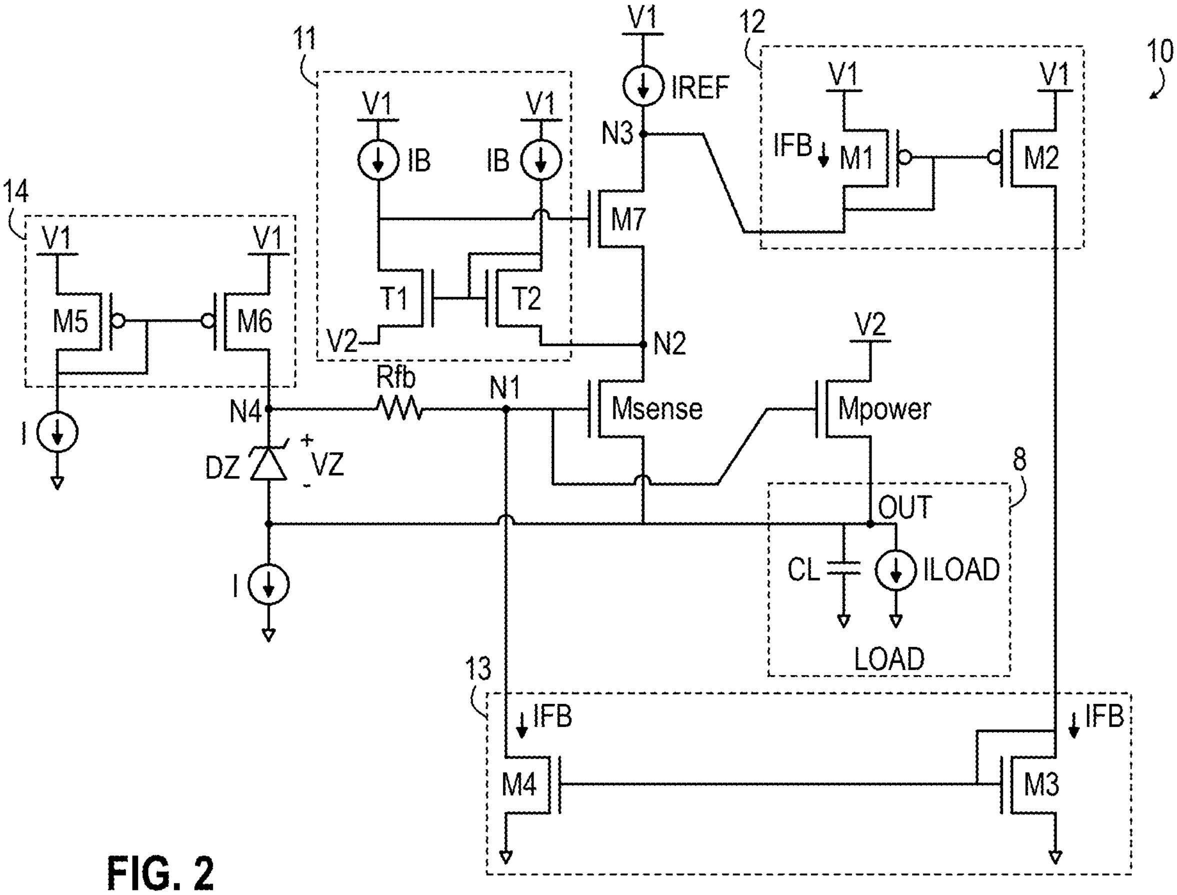
FIG. 2 is a schematic diagram of a first embodiment of a pass switch circuit disclosed herein.

Now described with reference to FIG. 2 is a pass switch circuit 10 that addresses the drawbacks of the prior art discussed above. The pass switch circuit 10 includes: an n-channel power transistor Mpower having its drain connected to receive a supply voltage V2, its source connected to output node OUT, and its gate connected to node N1; and an n-channel sense transistor Msense (e.g., being $1/1000^{th}$ the size of Mpower) having its drain connected to node N2, its source connected to the output node OUT, and its gate connected to node N1. The load 8 is connected between the output node OUT and ground.

A reference current generator IREF sources a reference current IREF to node N3. An n-channel transistor M7 has its drain connected to node N3 and its source connected to node N2. Amplifier 11 is formed by: n-channel transistor T1 having its source connected to receive supply voltage V2, its drain connected to the gate of n-channel transistor M7 and to receive a current IB from a current source, and its gate connected to the gate of n-channel transistor T2; and n-channel transistor T2 having its source connected to node N2, its drain connected to receive a current IB from a current source, and its gate connected to the gate of n-channel transistor T1 as well as to its own drain.

A first current mirror 12 is formed by: p-channel transistor M1 having its source connected to a supply voltage V1 (which is greater than supply voltage V2), its drain connected to node N3, and its gate and connected to node N3; and p-channel transistor M2 having its source connected to the supply voltage V1, its drain connected to the drain of n-channel transistor M3, and its gate connected to node N3.

A second current mirror 13 is formed by: n-channel transistor M3 having its drain connected to the drain of p-channel transistor M2 as well as to its gate, its source connected to ground, and its gate connected to the gate of n-channel transistor M4; and n-channel transistor M4 having its drain connected to node N1, its source connected to ground, and its gate connected to the gate of n-channel transistor M3.

A feedback resistor Rfb is connected between nodes N4 and N1. A Zener diode DZ has its cathode connected to node N4 and its anode connected to the output node OUT, and a first current sink sinks a current I from the output node OUT.

A third current mirror 14 is formed by: p-channel transistor M5 having its drain connected to a second current sink I which sinks the current I therefrom, its source connected to supply voltage V1, and its gate connected to its drain as well as to the gate of p-channel transistor M6; and p-channel transistor M6 has its source connected to supply voltage V1, its drain connected to nod N4, and its gate connected to the gate of p-channel transistor M5.

Note that the pass switch circuit 10 includes an enable/disable function, where the enable state turns the pass switch on, and in the disable (off) state, a pulldown is implemented between the gate of Mpower/Nsense and ground.

In operation, the amplifier 11 controls the gate of n-channel transistor N7 so as to force the voltage at node N2 to be equal to V2, ensuring that the drain-to-source voltages of Msense and Mpower are equal. Specifically, it is the negative feedback loop formed by amplifier 11 and M7 that fixes the voltage at N2 to be equal to V2. Since Mpower and Msense have their gates connected, this means that the current sunk by Msense is proportional to the current source by Mpower.

The operation of amplifier 11 relies on the behavior of transistors T1 and T2. When the voltage at node N2 is lower than V2, T2 conducts less current than T1. The current into T2 is fixed (IB). When the current into Mpower increases, the current through Msense increases, causing the voltage at node N2 to go down. Due to the fact that the VGS of T2 is fixed, the gate voltage of T1/T2 decreases. This causes the gate voltage of M7 to increase, which in turn causes the voltage at N2 to increase. Conversely, when the voltage at N2 is higher than V2, T2 conducts more current than T1, lowering the voltage at the gate of M7 and reducing its conductivity. This negative feedback mechanism maintains the voltage at N2 equal to V2.

Consider therefore the effect of the regulation of the n-channel transistor M7 on the voltage at node N3. The lower the load current ILOAD, the lower the current into follower M7, and consequently, the lower the amount of current the amplifier 11 requires the transistor M7 to source to node N2 to enforce equality between the voltage at node N2 and the supply voltage V2. Therefore the voltage at node N3 rises; as the voltage at node N3 rises, p-channel transistors M1 and M2 reduce the feedback current IFB sourced by current mirror 12 (and sunk from node N1 by current mirror 13). Thus, as load demand (and therefore ILOAD) decreases, the feedback current IFB reduces, with the result being that the voltage at N1 increases, and the gate to source voltage VGS of Msense and Mpower increases.

Stated another way, assuming K to be the scaling ratio between the sizes of Msense and Mpower (Mpower being K times the size of Msense), when the scaled load current $$\frac{ILOAD}{K}$$

is below the reference current IREF, the voltage at node n3 rises, turning off the current mirrors 12 and 13, so that the gate to source voltage VGS of Msense and Mpower is at its maximum, so that the on-resistance of Mpower is at its minimum, reducing power dissipation.

Conversely, as the load current ILOAD increases, the amplifier 11 requires the transistor M7 to source more current to node N2 to maintain equality between the voltage at node N2 and the supply voltage V2. Consequently, the voltage at node N3 decreases. As the voltage at node N3 falls, p-channel transistors M1 and M2 increase the feedback current IFB sourced by current mirror 12 (and sunk from node N1 by current mirror 13). Thus, as load demand (and therefore ILOAD) increases, the feedback current IFB increases, resulting in a decrease of the voltage at N1, and a reduction in the gate-to-source voltage VGS of Msense and Mpower.

Thus, when the scaled load current $$\frac{ILOAD}{K}$$

exceeds the reference current IREF, the voltage at node N3 falls below the threshold needed to keep M1 and M2 in cutoff. This causes the current mirrors 12 and 13 to become active, increasing the feedback current IFB. As a result, the gate-to-source voltage VGS of Msense and Mpower decreases, increasing their on-resistance. This action effectively limits the current through Mpower, protecting both the power transistor and the load from excessive current flow. In this state, Mpower operates in its linear region, actively regulating the current to prevent it from exceeding IREF*K, where K is the scaling ratio between Mpower and Msense.

The current mirror 14, formed by transistors M5 and M6, serves a crucial role in polarizing the Zener diode DZ. This arrangement ensures that the gate-to-source voltage of Mpower doesn't fall below the Zener voltage VZ, providing a minimum VGS for Mpower and Msense. The equal currents sunk by the current sinks connected to M5 and the anode of DZ establish a consistent voltage reference point at node N4. This reference point, in conjunction with the Zener voltage, creates a lower bound for the gate voltage at N1. Note that the current flowing through M6 should be greater than the sum of the current I plus the feedback current IFB to provide for proper polarization of DZ.

The feedback resistor Rfb, connected between nodes N4 and N1, plays a role in the dynamic response. It provides a high-frequency feedback path that allows for rapid adjustments to the gate voltage of Mpower and Msense in response to load changes. When the load current ILOAD suddenly changes, it affects the current balance through the Zener diode DZ and the current sink connected to the output node OUT. When the load current ILOAD suddenly changes, the output voltage at node OUT goes down. This causes the VGS of the power transistor Mpower to increase, leading to an increase in current through M7, which in turn causes the voltage at N3 to go down. This imbalance causes an immediate shift in the voltage at node N4 relative to OUT, even before the output voltage itself may change significantly due to output capacitance and Mpower regulation. This rapid voltage change at N4 results in an immediate change in voltage across Rfb, creating a current flow that quickly modifies the voltage at node N1. This fast adjustment of the gate voltage of Mpower and Msense occurs before the slower feedback loop through the current mirrors 12 and 13 can respond. The rapid initial response through Rfb helps to maintain output voltage stability and improves the circuit transient response to sudden load variations. The value of Rfb can be optimized to balance the speed of response with overall system stability, allowing for precise control of the power transistor Mpower operating point across a wide range of load conditions and transient events.

Figure 3:
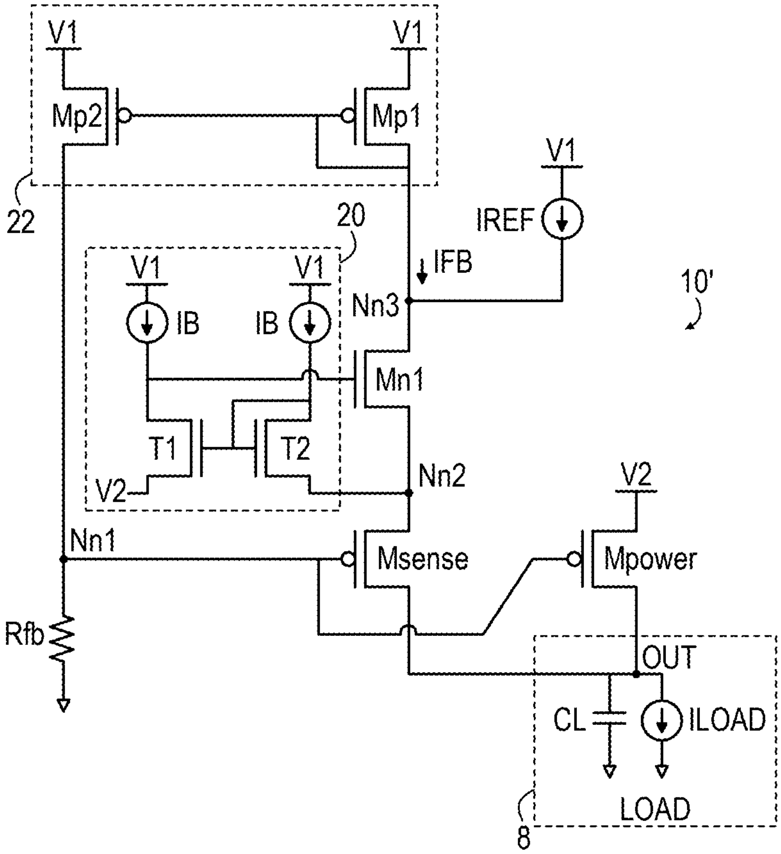
FIG. 3 is a schematic diagram of a second embodiment of a pass switch circuit disclosed herein.

As can be appreciated by those of skill in the art, the power transistor Mpower may be a p-channel transistor instead of an n-channel transistor. Such an embodiment is now described with reference to FIG. 3. Here, the pass switch circuit 10' includes: p-channel power transistor Mpower having its source connected to receive the supply voltage V2, its drain connected to the load 8 at the output node OUT, and its gate connected to node Nn1; and p-channel sense transistor Msense (e.g., being $\frac{1}{1000}^{th}$ the size of Mpower) having its source connected to node Nn2, its drain connected to the output node OUT, and it gate connected to node Nn1.

N-channel transistor Mn1 has its drain connected to node Nn3 and its source connected to node Nn2. Amplifier 20 is formed by: n-channel transistor T1 having its source connected to receive supply voltage V2, its drain connected to the gate of n-channel transistor MN1 and to receive a current IB from a current source, and its gate connected to the gate of n-channel transistor T2; and n-channel transistor T2 having its source connected to node Nn2, its drain connected to receive a current IB from a current source, and its gate connected to the gate of n-channel transistor T1 as well as to its own drain. A current source Iref sources reference current Iref to node Nn3.

A current mirror 22 is formed by: p-channel transistor MP1 having its source connected to receive supply voltage V1, its drain connected to node Nn3, and its gate connected to its drain as well as to the gate of p-channel transistor MP2; and p-channel transistor MP2 has its source connected to receive supply voltage V1, its drain connected to node Nn1, and its gate connected to the gate and drain of p-channel transistor MP1. A feedback resistor Rfb is connected between node Nn1 and ground.

In operation, the amplifier 20 controls the gate of n-channel transistor Mn1 so as to force the voltage at node Nn2 to be equal to V2, ensuring that the source-to-drain voltages of Msense and Mpower are equal. Since Mpower and Msense have their gates connected, this means that the current sourced by Msense is proportional to the current sourced by Mpower.

The operation of amplifier 20 relies on the behavior of transistors T1 and T2. The current into T2 is fixed (IB). When the current into Mpower increases, the current through Msense increases, causing the voltage at node Nn2 to go down. Due to the fact that the VGS of T2 is fixed, the gate voltage of T1/T2 decreases. This causes the gate voltage of Mn1 to increase, which in turn causes the voltage at Nn2 to increase. Conversely, when the voltage at Nn2 is higher than V2, T2 conducts more current than T1, lowering the voltage at the gate of MN1 and reducing its conductivity. This negative feedback mechanism maintains the voltage at Nn2 equal to V2.

Consider therefore the effect of the regulation of the n-channel transistor Mn1 on the voltage at node Nn3. The lower the load current ILOAD, the lower the amount of current the amplifier 20 requires the transistor Mn1 to source to node Nn2 to enforce equality between the voltage at node Nn2 and the supply voltage V2, and therefore the voltage at node Nn3 rises; as the voltage at node Nn3 rises, p-channel transistors MP1 and MP2 decrease the feedback current IFB sourced by current mirror 22 to node Nn1. Thus, as load demand (and therefore ILOAD) decreases, the feedback current IFB decreases, with the result being that the voltage at Nn1 decreases, and the gate-to-source voltage VGS of Msense and Mpower increases.

Stated another way, assuming K to be the scaling ratio between the sizes of Msense and Mpower (Mpower being K times the size of Msense), when the scaled load current $$\frac{ILOAD}{K}$$

is below the reference current Iref, the voltage at node Nn3 rises, turning off the current mirror 22, so that the gate-to-source voltage VGS of Msense and Mpower is at its maximum, so that the on-resistance of Mpower is at its minimum, reducing power dissipation.

Conversely, as the load current ILOAD increases, the amplifier 20 requires the transistor Mn1 to source more current to node Nn2 to maintain equality between the voltage at node Nn2 and the supply voltage V2. Consequently, the voltage at node Nn3 decreases. As the voltage at node Nn3 falls, p-channel transistors MP1 and MP2 increase the feedback current IFB sourced by current mirror 22 to node Nn1. Thus, as load demand (and therefore ILOAD) increases, the feedback current IFB increases, resulting in an increase of the voltage at Nn1, and a reduction in the gate-to-source voltage VGS of Msense and Mpower.

Thus, when the scaled load current $$\frac{ILOAD}{K}$$

exceeds the reference current IREF, the voltage at node Nn3 falls below the threshold needed to keep MP1 and MP2 in cutoff. This causes the current mirror 22 to become active, increasing the feedback current IFB. As a result, the gate-to-source voltage VGS of Msense and Mpower decreases, increasing their on-resistance. This action effectively limits the current through Mpower, protecting both the power transistor and the load from excessive current flow. Importantly, this equalization mechanism works both in the linear region and the saturation region of Mpower. This helps ensure that the output current is well controlled not only during normal operation but also during the startup of the pass switch when Mpower is in the saturation region. In this state, Mpower actively regulates the current to prevent it from exceeding Iref*K, where K is the scaling ratio between Mpower and Msense.

Note that good behavior of the pass switch circuit in terms of speed is mainly due to the direct current comparison at node NN3. This direct comparison, in combination with the rapid initial response through Rfb helps to maintain output voltage stability and improves the circuit transient response to sudden load variations.

The pass switch circuits 10 and 10' offer several advantages over conventional designs. They provides efficient power management across a wide range of load conditions, automatically adjusting the on-resistance of the power transistor Mpower to minimize power dissipation at low load currents while providing effective current limiting at high load currents. The use of the sense transistor Msense and current comparisons allow for fast and accurate current sensing and control without the need for a large sense resistor, reducing power loss. The feedback resistor Rfb enhances the circuit transient response, enabling rapid adaptation to sudden load changes. These designs design are particularly beneficial in systems with varying load demands, as they optimize power delivery efficiency while maintaining robust protection against overcurrent conditions.

Finally, it is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A pass switch circuit, comprising:

a power transistor configured to generate a load current to an output node;

a sense transistor configured to generate a scaled version of the load current;

a regulation circuit configured to equalize drain-to-source voltages of the power transistor and the sense transistor;

a current comparison circuit coupled to the regulation circuit and configured to generate a feedback current based upon a difference between a reference current and the scaled version of the load current; and a feedback circuit coupled to the current comparison circuit and configured to adjust a control voltage of the power transistor based on the feedback current;

wherein when the scaled version of the load current is below the reference current, the feedback circuit is configured to modify the control voltage of the power transistor so as to decrease on-resistance of the power transistor and reduce power dissipation; and wherein when the scaled version of the load current exceeds the reference current, the feedback circuit is configured to modify the control voltage of the power transistor so as to increase the on-resistance of the power transistor and limit the load current flow through the power transistor.

2. The pass switch circuit of claim 1, wherein the power transistor comprises an n-channel transistor having its gate connected to receive the control voltage;

wherein when the scaled version of the load current is below the reference current, the feedback circuit is configured to increase the control voltage of the power transistor, thereby decreasing the on-resistance of the power transistor and reducing power dissipation; and wherein when the scaled version of the load current exceeds the reference current, the feedback circuit is configured to decrease the control voltage of the power transistor, thereby increasing the on-resistance of the power transistor and limiting the load current flow through the power transistor.

3. The pass switch circuit of claim 2, wherein the sense transistor has a source connected to the output node, a drain connected to the regulation circuit, and a gate receiving the control voltage; and wherein the regulation circuit comprises:

an amplifier having a first input connected to a supply voltage, a second input connected to the drain of the sense transistor, and an output; and an n-channel transistor having a drain connected to the current comparison circuit, a source connected to the drain of the sense transistor, and a gate connected to the output of the amplifier.

4. The pass switch circuit of claim 3, wherein the feedback circuit comprises a current mirror having an input receiving the feedback current and an output sinking a replica of the feedback current from the gate of the power transistor and the gate of the sense transistor.

5. The pass switch circuit of claim 2, further comprising: a voltage limiting circuit coupled to the output node and the feedback circuit, the voltage limiting circuit configured to establish a minimum control voltage for the power transistor.

6. The pass switch circuit of claim 1, wherein the power transistor comprises a p-channel transistor having its gate connected to receive the control voltage;

wherein when the scaled version of the load current is below the reference current, the feedback circuit is configured to decrease the control voltage of the power transistor, thereby decreasing the on-resistance of the power transistor and reducing power dissipation; and wherein when the scaled version of the load current exceeds the reference current, the feedback circuit is configured to increase the control voltage of the power transistor, thereby increasing the on-resistance of the power transistor and limiting the load current flow through the power transistor.

7. The pass switch circuit of claim 6, wherein the sense transistor has a drain connected to the output node, a source connected to the regulation circuit, and a gate receiving the control voltage; and wherein the regulation circuit comprises:

an amplifier having a first input connected to a supply voltage, a second input connected to the source of the sense transistor, and an output; and an n-channel transistor having a source connected to the current comparison circuit, a drain connected to the source of the sense transistor, and a gate connected to the output of the amplifier.

8. The pass switch circuit of claim 7, wherein the feedback circuit comprises a current mirror having an input receiving the feedback current and an output sourcing a replica of the feedback current to the gate of the power transistor and the gate of the sense transistor.

9. The pass switch circuit of claim 6, further comprising: a voltage limiting circuit coupled between the output node and the feedback circuit, the voltage limiting circuit configured to establish a maximum control voltage for the power transistor.

10. A method of controlling a pass switch circuit, the method comprising:

generating a load current to an output node using a power transistor;

generating a scaled version of the load current using a sense transistor;

equalizing drain-to-source voltages of the power transistor and the sense transistor using a regulation circuit;

generating a feedback current based upon a difference between a reference current and the scaled version of the load current using a current comparison circuit; and adjusting a control voltage of the power transistor based on the feedback current using a feedback circuit;

when the scaled version of the load current is below the reference current, modifying the control voltage of the power transistor so as to decrease on-resistance of the power transistor and reduce power dissipation; and when the scaled version of the load current exceeds the reference current, modifying the control voltage of the power transistor so as to increase the on-resistance of the power transistor and limit the load current flow through the power transistor.

11. The method of claim 10, wherein the power transistor comprises an n-channel transistor, and wherein:

increasing the control voltage of the power transistor when the scaled version of the load current is below the reference current; and decreasing the control voltage of the power transistor when the scaled version of the load current exceeds the reference current.

12. The method of claim 11, further comprising:

receiving the feedback current at an input of a current mirror in the feedback circuit; and sinking a replica of the feedback current from a gate of the power transistor and a gate of the sense transistor using an output of the current mirror.

13. The method of claim 11, further comprising: establishing a minimum control voltage for the power transistor using a voltage limiting circuit coupled to the output node and the feedback circuit.

14. The method of claim 10, wherein the power transistor comprises a p-channel transistor, and wherein:

decreasing the control voltage of the power transistor when the scaled version of the load current is below the reference current; and increasing the control voltage of the power transistor when the scaled version of the load current exceeds the reference current.

* * * * *